(12) United States Patent
Miller et al.

(10) Patent No.: US 6,397,351 B1
(45) Date of Patent: May 28, 2002

(54) METHOD AND APPARATUS FOR RAPID DATA RESTORATION INCLUDING ON-DEMAND OUTPUT OF SORTED LOGGED CHANGES

(75) Inventors: Donald Lee Miller; Mark Anthony Sovik, both of Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/162,265

(22) Filed: Sep. 28, 1998

(51) Int. Cl.$^7$ ................................. H02H 3/05
(52) U.S. Cl. ........................................ 714/13
(58) Field of Search ......................... 714/13, 14, 15, 714/16, 17, 20, 6; 711/162; 707/203, 204

(56) References Cited

U.S. PATENT DOCUMENTS

| | | | |
|---|---|---|---|
| 4,907,150 A | 3/1990 | Arroyo et al. ............... | 364/200 |
| 5,226,157 A | 7/1993 | Nakano et al. .............. | 395/600 |
| 5,327,551 A | 7/1994 | Kaneko ....................... | 395/575 |
| 5,410,667 A | 4/1995 | Belsan et al. ............... | 395/425 |
| 5,502,836 A | 3/1996 | Hale et al. .............. | 395/497.01 |
| 5,530,801 A | 6/1996 | Kobayashi ............. | 395/182.11 |
| 5,625,817 A | 4/1997 | Wood et al. ................. | 395/614 |
| 5,649,152 A | 7/1997 | Ohran et al. ................. | 395/441 |
| 5,664,088 A | 9/1997 | Romanovsky et al. . | 395/182.11 |
| 5,712,971 A | 1/1998 | Stanfill et al. ........... | 395/183.1 |
| 5,715,386 A | 2/1998 | Fulton, III et al. ..... | 395/183.14 |
| 5,764,877 A * | 6/1998 | Lomet et al. ................. | 714/6 |
| 6,038,569 A * | 3/2000 | Beavin et al. .............. | 707/203 |
| 6,061,769 A * | 5/2000 | Kapulka et al. ............ | 711/162 |
| 6,144,999 A * | 11/2000 | Khalidi et al. .............. | 709/219 |

* cited by examiner

Primary Examiner—Robert Beausoleil
Assistant Examiner—X. Chung-Trans
(74) Attorney, Agent, or Firm—Dan Hubert & Assoc.

(57) ABSTRACT

Data is rapidly restored from a backup copy, and user access of the restored data further expedited by providing on-demand output of logged changes to the backup data. Contents of the backup data are the same as contents of corresponding primary data at a designated time when the backup data was created. If any changes to the primary data are received by the system after creating the backup copy, the changes are stored by the system in a change log. In one embodiment, where the system stores changes in multiple logs, the logs may be consolidated and sorted according to an appropriate schedule. Whenever primary data becomes unavailable, the system starts to apply logged changes to the backup copy right away, using the consolidated and sorted change log. When the system receives user requests to access the primary data, the system determines whether the log contains any changes that have not been applied to the backup data. If the log contains un-applied changes, the storage system provides the requesting user with an output of the most recent logged change from the log. On the other hand, if the log does not contain any un-applied changes, the storage system provides the requesting user with an output of the requested data from the backup data.

30 Claims, 6 Drawing Sheets

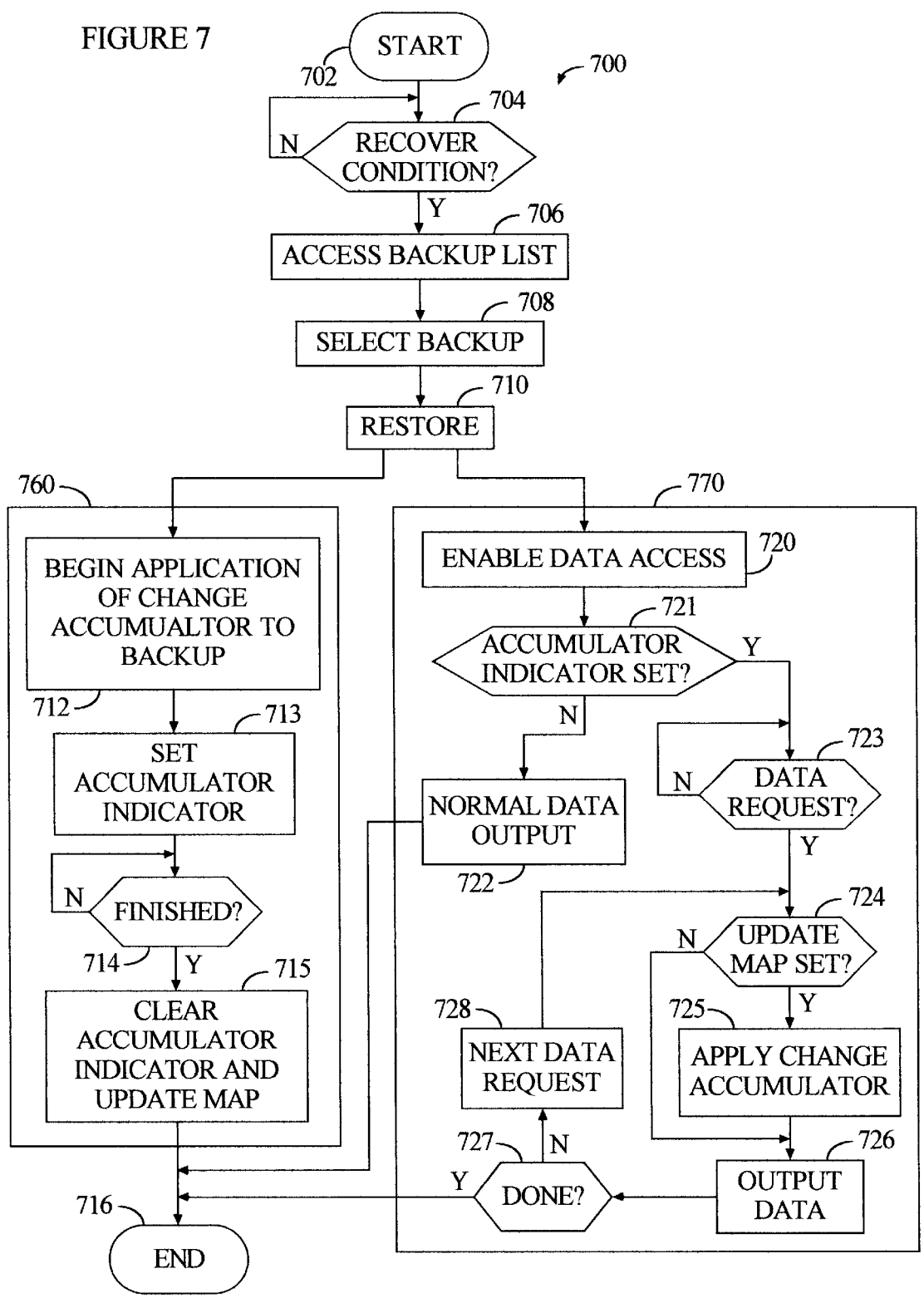

METHOD AND APPARATUS FOR RAPID DATA RESTORATION INCLUDING ON-DEMAND OUTPUT OF SORTED LOGGED CHANGES

BACKGROUND OF THE INVENTION

1. Field of the Invention

The present invention relates to digital data backup systems. More particularly, the invention concerns a technique for rapidly restoring unavailable data from corresponding backup data, where user access of the restored data is further expedited by providing on-demand output of logged changes to the backup data.

2. Description of the Related Art

With the increasing tide of digital information today, computer users encounter more data than ever to transmit, receive, and process. Data transmission and receipt speeds are continually increasing with each new advance in modems, fiber optics, ISDN, cable television, and other technology. Processing speeds are similarly advancing, as evidenced by the frequent introduction new products by the microprocessor industry.

In addition to transmitting, receiving, and processing data, storing data is another critical need for many users. In fact, many users demand high performance data storage systems to contain huge amounts of data, and to quickly access the data. Engineers are constantly making significant improvements in their storage systems by reducing storage density and increasing storage speed.

For many businesses, data storage is such a critical function that data loss cannot be tolerated. As a result, different techniques and systems for data backup have become widespread. Some examples include the peer-to-peer remote copy system ("PPRC") and extended remote copy system ("XRC"), both developed by International Business Machines Corp. ("IBM").

In many applications, it is not only essential to have backup data, but to have quick recovery from backup data in the event of data failure. Some applications that rely on the ability to quickly access stored data include automated teller networks of banks, financial information of stock brokers, reservation systems of airlines, and the like. In applications such as these, slow recovery from failed data can mean lost revenue. Therefore, when stored data does fail, it is important to restore the data from a backup copy as quickly as possible. From the user's perspective, data recovery time is part of the data access time, which should be as brief as possible.

In many backup systems, recovery involves a common sequence of operations. First, backup data is used to restore user data to a known state, as of a known date and time. Next, logged changes are applied to the restored data. The logged changes represent data received after the backup was made, and are usually stored in multiple "logs" that chronologically list changes received by that storage subsystem. The logged changes may even be combined and sorted to provide "change accumulation" data. Thus, applying logged changes involves updating the backup data by applying the change accumulation data, and then further updating the resultant data with any un-accumulated change logs. After this step, the data is considered to be restored, and the user's application program is permitted to access the restored data.

Although this approach enjoys widespread use today, and may even be recognized as a significant advance in the art, the overall data restoration process can still be too time consuming for certain users. When an application is waiting to access data, there is often a significant wait while the subsystem applies backup data, then the change accumulation data, and finally the further logged changes. Consequently, despite the benefit of this approach, it may not be completely satisfactory for all users due to certain unsolved problems.

SUMMARY OF THE INVENTION

Broadly, the present invention concerns a technique for rapidly restoring unavailable data from corresponding backup data, in which user access of the restored data is further expedited by providing on-demand output of logged changes to the backup data. As discussed more completely below, the invention is implemented in a storage system that contains certain backup data. The contents of the backup data are the same as contents of corresponding primary data at a designated time when the backup data was created. If any changes to the primary data are received by the system after creating the backup data, the changes are stored by the system in a change log. In one embodiment, where the system stores changes in multiple logs, the logs may be consolidated and sorted according to an appropriate schedule, such as periodically.

Whenever the primary data becomes unavailable, the system starts to apply logged changes to the backup data right away. The application of logged changes may use the consolidated and sorted change log if one has been prepared.

If the system receives a user request to access any subpart of the primary data while the logged changes are being applied, the system determines whether the log contains any changes that corresponds to the requested subpart, but have not been applied to the backup data. If the log contains un-applied changes affecting the requested subpart, the storage system provides the requesting user with an output of the most recent logged change from the log. On the other hand, if the log does not contain any un-applied changes, the storage system provides the user with an output of the requested subpart from the backup copy.

Accordingly, as shown above, one embodiment of the invention may be implemented to provide a method of rapidly restoring unavailable data from corresponding backup data, in which user access of the restored data is further expedited by providing on-demand output of logged changes to the backup data. In another embodiment, the invention may be implemented to provide an apparatus, such as a data storage system, configured to rapidly restore unavailable data from corresponding backup data, where user access of the restored data is further expedited by providing on-demand output of logged changes to the backup data. In still another embodiment, the invention may be implemented to provide a signal-bearing medium tangibly embodying a program of machine-readable instructions executable by a digital data processing apparatus to rapidly restore unavailable data from corresponding backup data, where user access of the restored data is further expedited by providing on-demand output of logged changes to the backup data.

The invention affords its users with a number of distinct advantages. Chiefly, the invention speeds data recovery. This minimizes system downtime, user waiting, and other undesirable effects of slow backup operations. Furthermore, the invention also provides a number of other advantages and benefits, which should be apparent from the following description of the invention.

BRIEF DESCRIPTION OF THE DRAWINGS

FIG. 7 is a flowchart of an operational routine for recovering backup data according to the invention.

DETAILED DESCRIPTION

The nature, objectives, and advantages of the invention will become more apparent to those skilled in the art after considering the following detailed description in connection with the accompanying drawings. As mentioned above, the invention concerns a data storage system capable of rapidly restoring unavailable data from backup data, where user access of the restored data is further expedited by providing on-demand output of logged changes to the backup data.

Hardware Components & Interconnections
Storage System Structure

Figure 1:
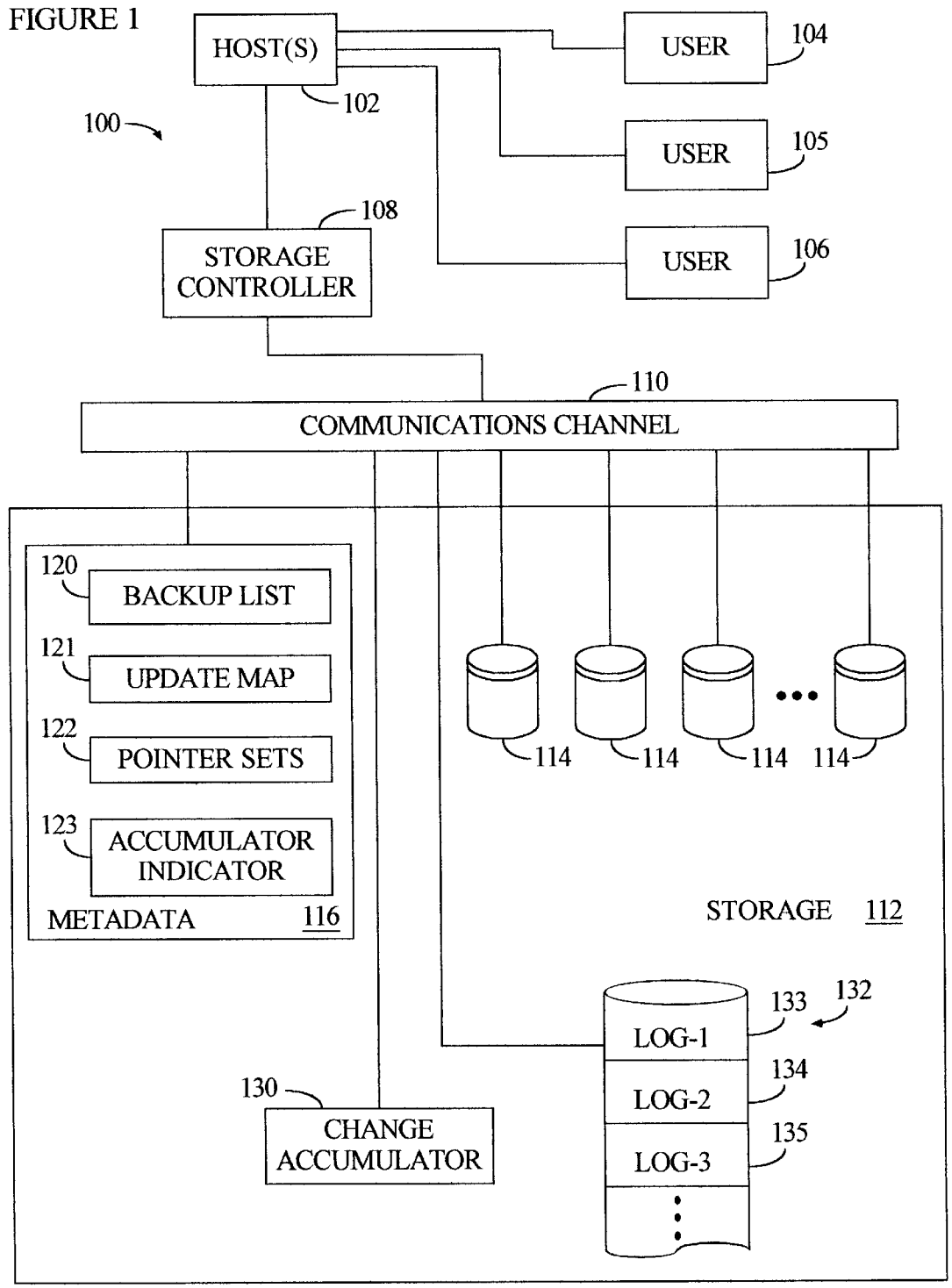
FIG. 1 is a block diagram of the hardware components and interconnections of a data storage system in accordance with the invention.

One aspect of the invention concerns a storage system, which may be embodied by various hardware components and interconnections, as shown by the exemplary system 100 of FIG. 1. The storage system 100 includes one or more hosts 102 coupled to a storage controller 108 and various users 104–106. For ease of explanation, the following description discusses the embodiment with a single host 102. The storage controller 108 is coupled to a storage 112, via a communications channel 110. Generally, the host 102 directs the storage controller 108 to store and retrieve data to serve the users 104–106, other computers (not shown), application programs of the host 102, and other sources. The host 102 regards stored data according to a high-level view, which may include one or more as "logical volumes," for example. The storage controller 108 translates between the logical view of the host 102 and a physical view of data that pertains to actual addresses, extents, tracks, sectors, cylinders, and the like.

Considering the components of FIG. 1 in more detail, the host 102 comprises a digital data processing machine such as a personal computer, mainframe computer, server, computer workstation, supercomputer, etc. As a specific example, the host 102 may be implemented by an IBM model S/390 machine. The users 104–106 may be human users, other computers, remote terminals, keyboards, server consoles, application programs, or other input sources.

In one example, some functions of the storage controller 108 may be performed by an IBM model 3990 storage controller, with some other functions being performed by processing hardware of an IBM model RAMAC RVA storage subsystem. In this embodiment, the storage 112 is provided by the storage media of the RAMAC RVA storage subsystem and includes multiple storage units 114, such as magnetic disk drive storage.

As discussed in greater detail below, the metadata 116 contains statistics about data contained on the storage units 114. More specifically, the metadata 116 includes a backup list 120, a list of pointer sets 122, a change accumulator indicator 123, and an update map 121, as discussed below.

The metadata 116 may also include, for example, lookup tables to assist the storage controller 108 in translating between logical and physical addresses, along with various tables and lists more thoroughly discussed below. The metadata 116 and its subcomponents may comprise one or more hardware and/or software constructs, such as buffers, registers, storage addresses, storage devices, etc.

In addition to the data storage units 114, the storage also includes a change accumulator 130 and a change log 132 that may include multiple separately constructed change logs 133–135. Although shown in the storage 112, the change accumulator 130 and change log 132 may be located elsewhere if better suited to the particular application. Furthermore, the change accumulator 130 and change log 132 may be implemented by any suitable hardware and/or software construct, depending on the needs of the particular application.

The communications channel 110 provides a digital communications link between the storage controller 108 and the storage 112. The channel 110 may be provided by many different hardware arrangements, such as a small computer standard interface ("SCSI"), ESCON interface, intelligent bus, etc.

Exemplary Digital Data Processing Apparatus

Figure 2:
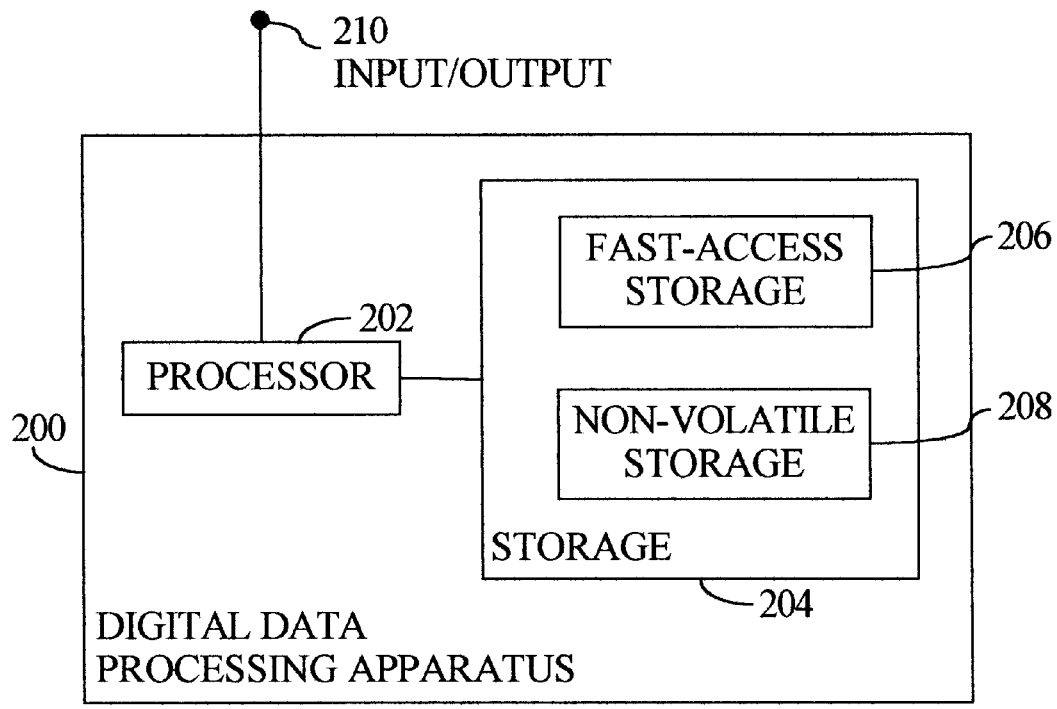
FIG. 2 is a block diagram of a digital data processing machine in accordance with the invention.

Another aspect of the invention concerns a digital data processing apparatus, provided to manage backup and recovery operations involving the storage 112. This apparatus may serve to implement the storage controller 108, the controller 108, and certain control hardware of the storage 112, or other components or combinations as needed. This apparatus may be embodied by various hardware components and interconnections, one example of which is shown in FIG. 2.

The apparatus 200 includes a processor 202, such as a microprocessor or other processing machine, coupled to a storage 204. In the present example, the storage 204 includes a fast-access storage 206, as well as nonvolatile storage 208. The fast-access storage 206 may comprise random access memory ("RAM"), and may be used to store the programming instructions executed by the processor 202. The nonvolatile storage 208 may comprise, for example, one or more magnetic data storage disks such as a "hard drive," a tape drive, or any other suitable storage device. The apparatus 200 also includes an input/output 210, such as a line, bus, cable, electromagnetic link, or other means for exchanging data with the processor 202.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204 may be provided on-board the processor 202, or even provided externally to the apparatus 200.

Operation

In addition to the various hardware embodiments described above, a different aspect of the invention concerns a method for rapidly restoring unavailable data from backup data, where user access of the restored data is further expedited by providing on-demand output of logged changes to the backup data.

Signal-Bearing Media

In the context of FIGS. 1–2, such a method may be implemented, for example, by operating the storage controller 108, as embodied by a digital data processing apparatus 200, to execute a sequence of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to rapidly restore unavailable data from backup data, and also expedite user access to restored data by providing on-demand output of logged changes to the backup data.

Figure 3:
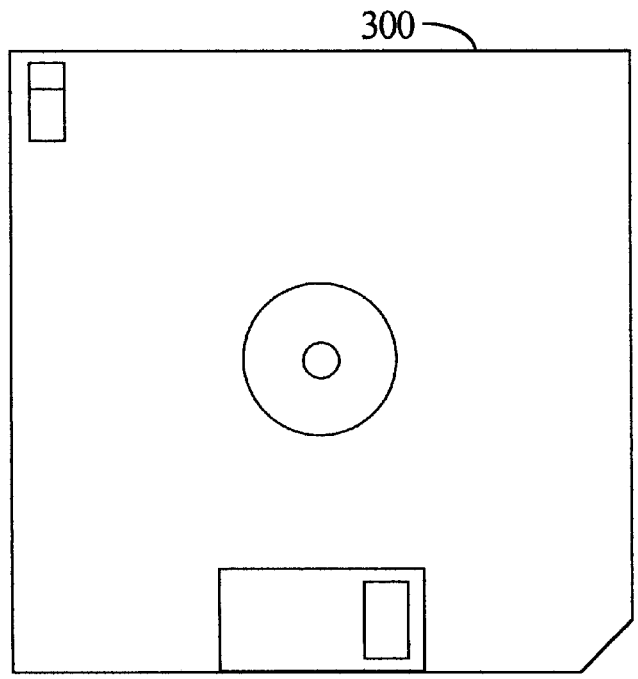
FIG. 3 shows an exemplary signal-bearing medium in accordance with the invention.

This signal-bearing media may comprise, for example, RAM (not shown) contained within the storage controller 108, as represented by the fast-access storage 206 of the apparatus 200. Alternatively, the instructions may be contained in another signal-bearing medium, such as a magnetic data storage diskette 300 (FIG. 3), directly or indirectly accessible by the storage controller 108. Whether contained in the fast-access storage 206, diskette 300, storage 112, or elsewhere, the instructions may be stored on a variety of machine-readable data storage media, such as direct access storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise software object code, compiled from a language such as "C."

Snap Copy Technology—Storage Diagram

In the illustrated example, the system 100 performs backup operations including "internal" and "external" backups. Internal backups are "immediate" backups created by using a pointer/data freeze technique, which is discussed in U.S. application Ser. No. 09/162,333 now U.S. Pat. No. 6,226,759, entitled "METHOD AND APPARATUS FOR IMMEDIATE DATA BACKUP BY DUPLICATING POINTERS AND FREEZING POINTER/DATA COUNTERPARTS," filed herewith in the names of the present inventors, and assigned to International Business Machines Corp. The foregoing application, in its entirety, is incorporated by reference into the present application.

In addition to "internal" backups, backups of the present invention may also include "external" backups, which are full, redundant copies of source data. Unlike internal backups, these copies are separate from the source data upon creation. External backups may reside on the storage 112, at a remote site, or on another location that is physically separate from the storage 112 to lessen the damage from a destructive data loss at the site 100. External backups may be performed by new techniques, or various established methods known to those of ordinary skill in the art.

The internal backups incorporate certain aspects of "snap copy" technology, which is a technique to quickly create a copy of data by duplicating the data's pointer set. Generally, with snap copying, data records are "copied" by creating a duplicate set of pointers referencing the original data record. This enables access to the data record via two virtual addresses while only a single physical copy of the data record actually resides in storage. "Snap copy" operations are discussed in greater detail in the following reference, which is incorporated herein by reference: U.S. Pat. No. 5,410,667 entitled "Data Record Copy System for a Disk Drive Array Data Storage Subsystem," issued on Apr. 25, 1995 to Belsan et al.

Figure 4A:
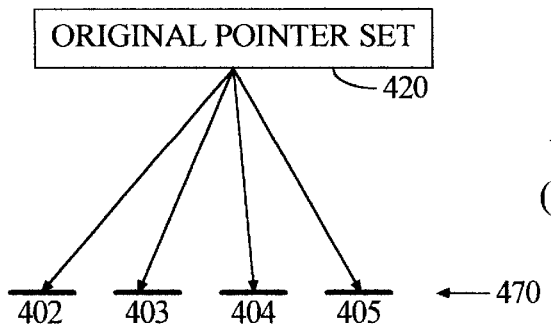
FIGS. 4A–4D are block diagrams showing pointer use involved in making a "snap" copy, as known in the art.

As explained below, snap copy provides some but not all of the features needed to backup data according to the invention. To aid in understanding the invention, FIGS. 4A–4D illustrate the operation of snap copy. Referring to FIG. 4A, an original dataset 470 is stored in multiple storage locations 402–405, also called "subparts." Each subpart may comprise an address, address range, group of selected addresses, partition, block, or other suitable region of storage. These storage locations 402–405 are identified by an original pointer set 420, which contains the locations' addresses. More particularly, each subpart of the dataset 470 is identified by a different pointer of the pointer set 420.

Figure 4B:
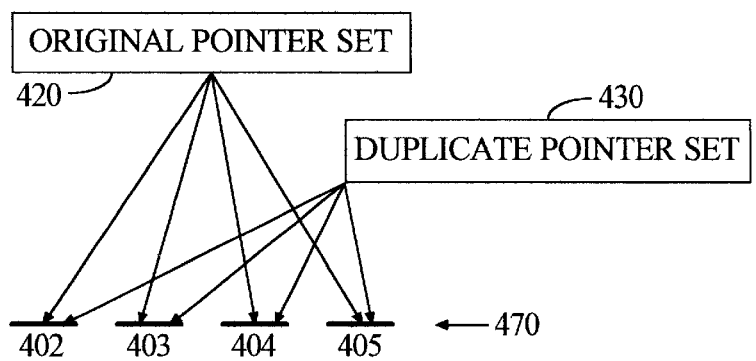
Figure 4C:
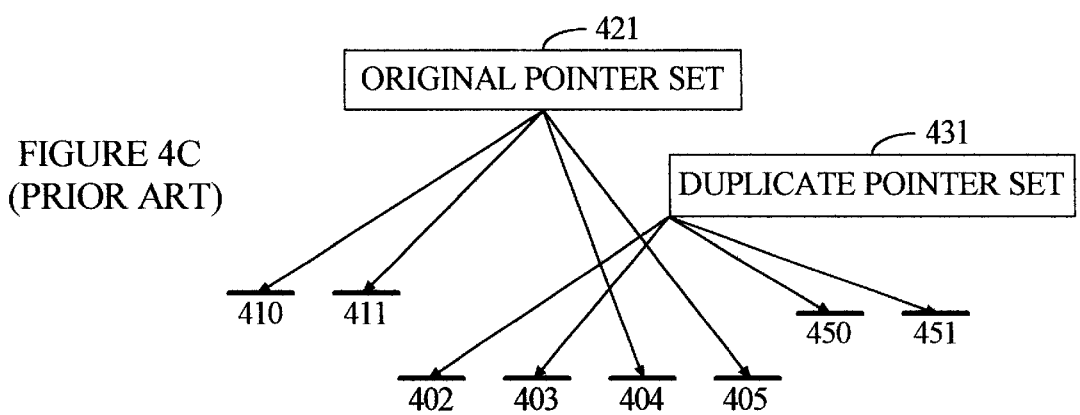
Figure 4D:
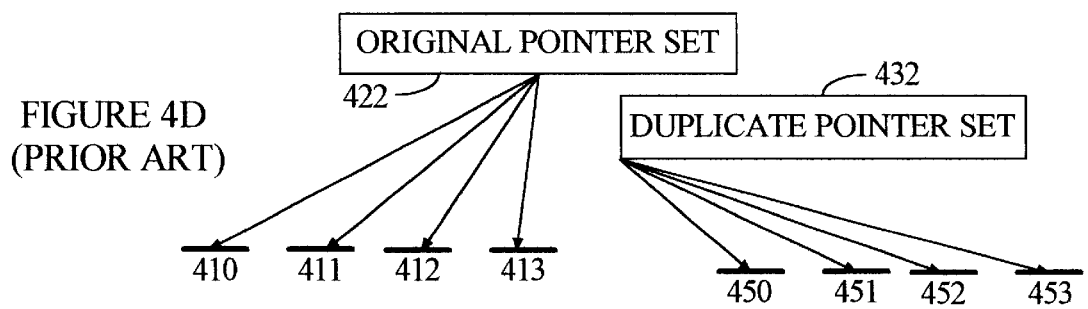

As shown by FIG. 4B, the snap copy is made by creating a duplicate pointer set 430, also pointing to the locations 402–405. At this point, there are two "virtual" copies of the dataset 470, an original dataset and a duplicate dataset. As the original dataset is modified, so is the original pointer set 420. For example, if the data of locations 402–403 in the original dataset are replaced with new data in locations 410–411, the original pointer set is modified as shown by 421 (FIG. 4C). Changes to the duplicate dataset are effected in the same way. For instance, if the data of locations 404–405 in the duplicate dataset are replaced with new data in locations 450–451, the duplicate pointer set 430 is modified as shown by 431 (FIG. 4C). After a sufficient number of changes, the original and duplicate datasets may diverge from each other completely, as shown in FIG. 4D. Moreover, the updated original pointer set 422 and duplicate pointer set 432 now identify storage locations (410–413 and 450–453) that are completely different than the storage locations (402–405) of the original dataset 470.

Backup and Restore Sequences—Explained by Storage Diagram

Figure 5A:
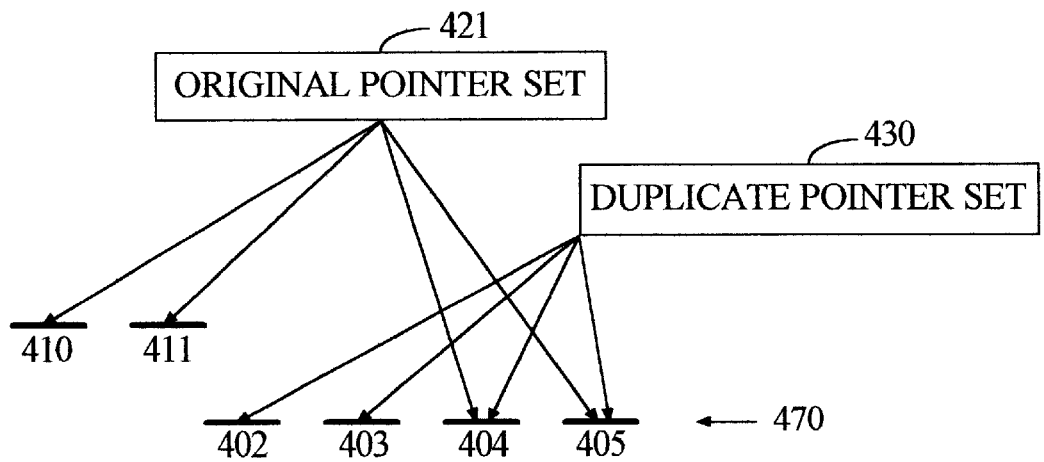
FIGS. 5A–5B are block diagrams showing pointer use involved in making an immediate backup copy by duplicating pointers and freezing the pointer/data counterparts in accordance with the invention.

When the system 100 performs an internal backup, the system creates a backup copy of data using a snap copy as illustrated in FIGS. 4A–4B. This copy constitutes a virtual backup copy of its source data. However, unlike the snap copy, the invention does not permit the duplicate pointer set and its associated data to diverge from the original dataset 470. In effect, the duplicate pointer set 430 and the data in storage locations 402–405 are frozen. As shown in FIG. 5A, changes are permitted to the original pointer set and its pointed-to data. The example of FIG. 5A shows a modified original pointer set 421 identifying some of the original locations 404–405, along with some new locations 410–411.

Figure 5B:
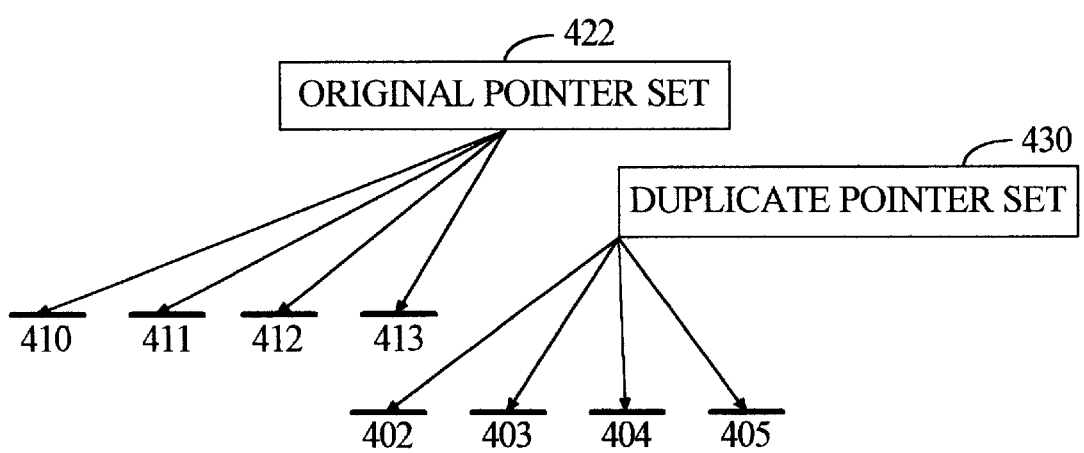

After a sufficient number of changes, the original dataset may diverge from the duplicate dataset completely, as shown in FIG. 5B. In this example, a series of data updates have resulted in an original pointer set 422 that now identifies storage locations 410–413 completely different from the original locations 402–405. However, only the pointer set 422 is permitted to identify storage locations completely different than the original dataset 420. The duplicate pointer set 430, which fixedly identifies an "internal backup" dataset, still points to the locations 402–405. Accordingly, these unchanged locations (402–405) serve as backup data, and are available to restore lost data. If the data 410–413 and/or original pointer set 422 are lost, the duplicate pointer set 430 is copied into the original pointer set 422, thereby resetting the original pointer set 422 to the original dataset's value at the time the internal backup was made using locations 402–405.

Metadata

In the illustrated example, the storage controller 108 uses metadata 116 including the backup list 120, pointer set list 122, accumulator indicator 123, and update map 121. The metadata 116 may also include a variety of other information useful in managing the storage 112, as will be appreciated by those of ordinary skill in the art having the benefit of this disclosure.

Table 1 (below) shows an the contents of exemplary backup list 120. The backup list identifies each backup by name, the name of the source dataset that is backed up, the type of backup (external or internal), the date and time of the backup, the backup's location (if external), and the address of the pointer set that identifies the backup (if internal).

TABLE 1

Backup List

| NAME OF BACKUP DATASET | NAME OF DATASET THAT IS BACKED-UP | TYPE | DATE/TIME | LOCATION OF EXTERNAL BACKUP | POINTER SET ADDRESS |
|---|---|---|---|---|---|
| DATASET-1 EXTERNAL BACKUP #1 | DATASET-1 | ext. | 1-1-98, 12:00 | off-site magnetic tape | n/a |
| DATASET-1, INTERNAL BACKUP #1 | DATASET-1 | int. | 1-1-98, 13:00 | n/a | 0002 |
| DATASET-1, INTERNAL BACKUP #2 | DATASET-1 | int. | 1-1-98, 14:00 | n/a | 0003 |
| DATASET-2, INTERNAL BACKUP #1 | DATASET-2 | ext. | 1-1-98 12:00 | tape library | n/a |

As shown above, the backup list's "pointer set address" column lists the address of each pointer set, where each pointer set includes pointers identifying an internal backup. Table 2 depicts a exemplary pointer set list 122. Each pointer set has an address, which is identified by the "pointer set address" of Table 1. Each pointer set corresponds to one internal backup, and its pointers identify the subpart addresses that contain that internal backup.

TABLE 2

Pointer Sets

| POINTER SET ADDRESS | POINTER SET |
|---|---|
| 0001 | 1000, 1001, 1002, 1010, 1098, 2020 |
| 0002 | 2500, 2501 |
| 0003 | 3000, 3001, 3002, 3003, 3005 |
| 0004 | 1003, 2501, 3005, 3006 |
| 0005 | 9000, 9500, 9999 |

The update map 121 identifies all subparts of the backup dataset that have one or more related updates in the change accumulator 130. As an example, the update map 121 may comprise a bit map, where each bit represents one subpart of the backup dataset, and the status of that bit indicates whether the change accumulator 130 contains any updates affecting that subpart. The change accumulator indicator 123 tells whether the backup restoration process (described below) is currently applying any change accumulator data to restored backup data. As an example, the indicator 123 may comprise a flag such as a storage bit.

Change Accumulation

Figure 6:
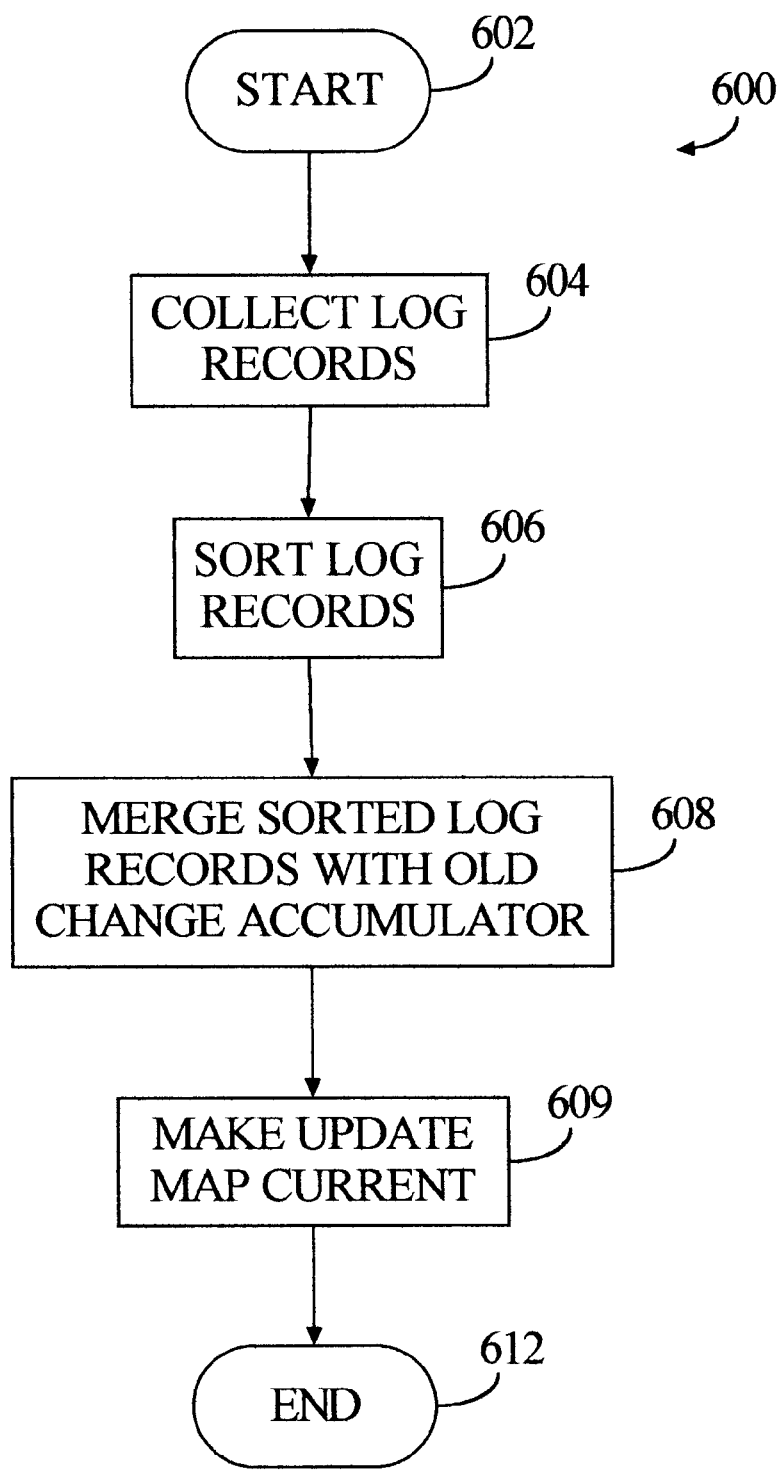
FIG. 6 is a flowchart of an operational routine for collecting and organizing log records.

FIG. 6 shows a sequence 600 to illustrate one aspect of the present invention, which involves the accumulation and sorting of log records. For ease of explanation, but without any intended limitation, the example of FIG. 6 is described in the context of the storage system 100 described above (FIG. 1). The steps are initiated in step 602, which may be triggered by various events depending upon the specific application of the invention. For instance, step 602 (and the routine 600) may be commenced when the system 100 is powered up, when the backup facility of the invention is enabled, whenever a threshold number of updates have been received, whenever a threshold number of log records have been stored, etc.

After step 602, the storage controller 108 collects all log records 132, such as the log records 133, 134, and 135. This may be performed by loading all log records into memory, or otherwise reading the log records 132. Next, in step 606 the storage controller 108 sorts the aggregated log records. Since the system 100 logs updates in the order of receipt, sorting and re-storing the log records creates a modified log that can be more efficiently applied to the backup data. As one example, the log records 132 may be sorted first according to the datasets that each log record corresponds to, then by attributes such as date, time, etc., within each dataset. In an embodiment that uses keys to place datasets within a record, the log records may be further sorted according to the relevant key, such as a key sequence dataset (KSDS) key, relative byte address (RBA) key, relative record dataset (RRD) key, etc. The sorted log records may be temporarily stored in the storage 112, maintained in memory, or kept in another location pending the ensuing step 608, which merges the sorted log records with the previously constructed contents (if any) of the change accumulator 130.

Contents of the change accumulator 130 are stored to provide random access to any of its constituent records. As an additional measure, each record in the change accumulator may be organized to provide convenient access to its constituent datasets using data keys. For instance, as mentioned above, the log records may be keyed according to KSDS, RBA, RRN, or another suitable scheme.

Following step 608, step 609 modifies the update map 121 to reflect the log records newly added to the change accumulator 130; this makes the update map 121 current. In one example, where the update map 121 is a bit map, step 609 involves setting the bits that correspond to the newly accumulated log records. After step 608, the routine 600 ends in step 612.

Restore Sequence

FIG. 7 shows a sequence 700 to illustrate one example of the present invention's method of restoring backed-up data. For ease of explanation, but without any intended limitation, the example of FIG. 7 is described in the context of the storage system 100 described above (FIG. 1). After step 702, the storage controller 108 asks whether a recover condition exists (step 704). A recover condition may be initiated by a user such as a system administrator, or automatically by the storage controller 108 or host 102 upon detection of data corruption, failure of a storage unit 114, failed communication with one of the units 114, etc.

If a recover condition exists, the storage controller 108 consults the metadata 116 to access the backup list 120 (step 706). In step 708, the controller 108 selects the appropriate backup data for use in recovery. Selection of backup data may be done according to predetermined criteria, which consider factors such as the recency of backup data, availability of backup data on-site, etc.

After selecting the backup data, the storage controller 108 executes restoration in step 710. In the case of an external backup, recovery involves known techniques adapted to this invention in a manner that should be apparent to ordinarily skilled artisans having the benefit of this disclosure. In the case of an internal backup, recovery is performed by copying the duplicate (backup) pointer set into the current pointer set of the failed data. Thus, the dataset is nearly instantly restored to the state of the data when the internal backup was made. The details of internal backup recovery are explained in the application "METHOD AND APPARATUS FOR IMMEDIATE DATA BACKUP BY DUPLICATING POINTERS AND FREEZING POINTER/DATA COUNTERPARTS," identified above.

After step 710, sequences 760 and 770 are initiated concurrently. Generally, the sequence 760 applies contents of the change accumulator 130 to the restored backup data. The sequence 770 provides users with immediate access to up-to-date backup data, regardless of whether the sequence 760 has finished applying the change accumulated updates.

More specifically, the sequence 760 starts in step 712, where the storage controller 108 begins to apply the change accumulator 130 contents to the backup data. In step 713, the storage controller 108 sets the accumulator indicator 123, to signify that application of the change accumulator 130 to the restored backup data is occurring.

When step 714 detects that the storage controller 108 has finished applying contents of the change accumulator to the restored backup data, the storage controller 108 clears the accumulator indicator 123 and the update map 121 (step 715). At this time, having updated the backup data with the accumulated log records, the change accumulator 130 is also cleared. Following step 715, the routine 760 ends step 716.

As mentioned above, the sequence 770 has a different function than the sequence 760. Namely, the sequence 770 satisfies data requests from sources such as the users 104–106, hosts 102, and application programs. This is performed using the restored backup data, and in the case of updated data, the contents of the change accumulator 130 as well. The sequence 770 starts in step 720, where the storage controller 108 sends a signal to the host 102 telling the host 102 that the failed primary data is once again available. In this step, access to the backup data is enabled. In response, the host 102 processes and forwards to the storage controller 108 any data access requests from the users 104–106, application programs, etc.

In step 721, the storage controller 108 determines whether the accumulator indicator 123 is set, signifying ongoing application of the change accumulator 130 to the backup data (i.e., sequence 760). If the accumulator indicator 123 is not set, then updates from the change accumulator 130 are not being applied to the backup data. In this event, the backup data is current, and the storage controller 108 provides data access normally in step 722, and then the routine 770 ends in step 716.

On the other hand, if the accumulator indicator 123 is set, then records of the backup may be current or stale, depending on whether there are any related log records in the change accumulator 130. In this event, control advances to step 723, in which the storage controller 108 waits for a data request from the host 102. In response to a data access request involving the backup data, the storage controller 108 in step 724 determines whether the update map 121 is set for any data identified in the request. If the update map 121 is not set for this data, there are no log records in the change accumulator 130 pertaining to the requested data. In this event, the storage controller 108 outputs data directly from the backup data (step 726). In contrast, if the update map 121 is set for the requested data, the storage controller 108 first updates the backup data with the relevant log records from the change accumulator (step 725), and then provides an output of the now current data from the backup data (step 726). After step 726, the step 727 asks whether there are any more data requests, and if so, considers the next data request in step 728, thereafter returning to step 724, as discussed above. When all data requests have been processed, step 727 advances to step 716, where the routine 770 ends.

Other Embodiments

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

What is claimed is:

1. A method for restoring a backup dataset in a storage system, where contents of the backup dataset comprise contents of a corresponding original dataset upon creation of the backup dataset and where changes to the original dataset received by the system after creating the backup dataset are logged by the system in a change log, the method comprising:

in response to unavailability of the original dataset, commencing application of the logged changes to the backup dataset; and during the application of the logged changes to the backup dataset, receiving one or more requests to access one or more subparts of the original dataset, and responsive to each request, for each subpart:

determining whether the change log contains any changes not yet applied to the subpart of the backup dataset; and satisfying the request by:

if the log contains one or more changes not yet applied to the subpart of the backup dataset, providing an output of the subpart from the log the output comprising a most recent one of the changes not yet applied;

if the log does not contain any logged changes not yet applied to the subpart of the backup dataset, providing an output of the subpart from the backup dataset.

2. The method of claim 1, the changes being logged into the changed log according to chronological order of receipt, the method further including sorting the logged changes, where the application of the logged changes to the backup dataset comprises updating the backup dataset according to the sorted logged changes.

3. The method of claim 2, the sorting of the logged changes comprising sorting the logged changes by subpart and then according to the chronological order of receipt of the changes by the storage system.

4. The method of claim 1, the changes being logged into the change log by storage in multiple change logs, the method further including combining the multiple change logs, where the application of the logged changes to the backup dataset comprises updating the backup dataset according to the combined change log.

5. The method of claim 1, the changes being logged into the change log according to chronological order of receipt in multiple change logs, the method further including combining and sorting the multiple change logs, where the application of the logged changes to the backup dataset comprises updating the backup dataset according to the combined and sorted change log.

6. The method of claim 5, the combining and sorting of the multiple change logs further including storing the combined and sorted multiple change such that each constituent logged change is randomly accessible.

7. The method of claim 6, the combined and sorted multiple change logs being stored in key sequence dataset (KSDS) format.

8. The method of claim 1, the method further comprising:
   before applying the logged changes to the backup dataset, performing a second backup operation using the backup dataset to create a second backup dataset.

9. The method of claim 1, the operation of providing an output of the subpart from the log comprising applying the changes not yet applied to the subpart of the backup dataset to the backup dataset, and then providing an output of the subpart from the backup dataset.

10. A signal-bearing medium tangibly embodying a program of machine-readable instructions executable by a digital processing apparatus to perform operations for restoring a backup dataset in a storage system, where contents of the backup dataset comprise contents of a corresponding original dataset upon creation of the backup dataset, and where changes to the original dataset received by the system after creating the backup dataset are logged by the system in a change log, the operations comprising:
   in response to unavailability of the original dataset, commencing application of the logged changes to the backup dataset; and
   during the application of the logged changes to the backup dataset, receiving one or more requests to access one or more subparts of the original dataset, and responsive to each request, for each subpart:
      determining whether the change log contains any changes not yet applied to the subpart of the backup dataset; and
      satisfying the request by:
         if the log contains one or more changes not yet applied to the subpart of the backup dataset, providing an output of the subpart from the log, the output comprising a most recent one of the logged changes not yet applied;
         if the log does not contains change any not yet applied to the subpart of the backup dataset, providing an output of the subpart from the backup dataset.

11. The medium of claim 10, the changes being logged into the change log according to chronological order of receipt, the operations further including sorting the logged changes, where the application of the logged changes to the backup dataset comprises updating the backup dataset according to the sorted logged changes.

12. The medium of claim 11, the sorting of the logged changes comprising sorting the logged changes by subpart and then according to the chronological order of receipt of the changes by the storage system.

13. The medium of claim 10, the changes being logged into the change log by storage in multiple change logs, the operations further including combining the multiple change logs, where the application of the logged changes to the backup dataset comprises updating the backup dataset according to the combined change log.

14. The medium of claim 10, the changes being logged into the change log according to chronological order of receipt by storage in multiple change logs, the operations further including combining and sorting the multiple change logs, where the application of the logged changes to the backup dataset comprises updating the backup dataset according to the combined and sorted change log.

15. The medium of claim 14, the combining and sorting of the multiple change logs further including storing the combined and sorted multiple change such that each constituent logged change is randomly accessible.

16. The medium of claim 15, the combined and sorted multiple change logs being stored in a key sequence dataset (KSDS) format.

17. The medium of claim 10, the operations further comprising:
   before applying the logged changes to the backup dataset, performing a second backup operation using the backup dataset to create a second backup dataset.

18. The medium of claim 10, the operation of providing an output of the subpart from the log comprising applying the changes not yet applied to the subpart of the backup dataset to the backup dataset, and then providing an output of the subpart from the backup dataset.

19. A computer-driven backup system, comprising:
   a data storage containing a backup dataset having contents that comprise contents of a corresponding original dataset upon creation of the backup dataset, the storage maintaining a change log containing changes to the original dataset received by the system after creating the backup dataset; and
   a storage controller coupled to the storage and programmed to restore the backup dataset by performing operations comprising:
      in response to unavailability of the original dataset, commencing application of the logged changes to the backup dataset; and
      during the application of the logged changes to the backup dataset, receiving one or more requests to access one or more subparts of the original dataset, and responsive to each request, for each subpart:
         determining whether the change log contains any changes not yet applied to the subpart of the backup dataset; and
         satisfying the request by:
            if the log contains one or more changes not yet applied to the subpart of the backup dataset, providing an output of the subpart from the log, the output comprising a most recent one of the logged changes not yet applied;
            if the log does not contains any changes not yet applied to the subpart of the backup dataset, providing an output of the subpart from the backup dataset.

20. The system of claim 19, the changes being logged into the change log according to chronological order of receipt, the operations further including sorting the logged changes, where the application of the logged changes to the backup dataset comprises updating the backup dataset according to the sorted logged changes.

21. The system of claim 20, the sorting of the logged changes comprising sorting the logged changes by subpart and then according to the chronological order of receipt of the changes by the storage system.

22. The system of claim 19, the changes being logged into the change log by storage in multiple change logs, the operations further including combining the multiple change logs, where the application of the logged changes to the backup dataset comprises updating the backup dataset according to the combined change log.

23. The system of claim 19, the changes being logged into the change log according to chronological order of receipt by storage in multiple change logs, the operations further including combining and sorting the multiple change logs, where the application of the logged changes to the backup dataset comprises updating the backup dataset according to the combined and sorted change log.

24. The system of claim 23, the combining and sorting of the multiple change logs further including storing the combined and sorted multiple change such that each constituent logged change is randomly accessible.

25. The system of claim 24, the combined and sorted multiple change logs being stored in key sequence dataset (KSDS) format.

26. The system of claim 19, the operations further comprising:
   before applying the logged changes to the backup dataset, performing a second backup operation using the backup dataset to create a second backup dataset.

27. The system of claim 19, the storage controller being programmed such that the operation of providing an output of the subpart from the log comprises applying the changes not yet applied to the subpart of the backup dataset to the backup dataset, and then providing an output of the subpart from the backup dataset.

28. A method for restoring a backup dataset in a storage system, where contents of the backup dataset comprise contents of a corresponding original dataset upon creation of the backup dataset and where changes to the original dataset received by the system after creating the backup dataset are logged by the system in a change log, the method comprising:
   in response to unavailability of the original dataset, commencing application of the logged changes to the backup dataset; and
   during the application of the logged changes to the backup dataset, receiving one or more requests to access one or more subparts of the original dataset, and responsive to each request, for each subpart:
      determining whether the change log contains any changes not yet applied to the subpart of the backup dataset; and
      satisfying the request by:
         if the log contains one or more changes not yet applied to the subpart of the backup dataset, providing an output of the subpart from the log the output comprising a most recent one of the changes not yet applied;
         if the log does not contain any logged changes not yet applied to the subpart of the backup dataset, providing an output of the subpart from the backup dataset;
   responsive to receipt of each change to the original, representing the change in an update map;
   upon commencing application of the logged changes to the backup dataset, setting an indicator; and
   responsive to application of a logged change to the backup dataset, removing representation of the logged change from the update map;
   where the operation of determining of whether the change log contains any changes not yet applied to the subpart of the backup dataset comprises determining whether the indicator is set, and if the indicator is set, determining whether the update map contains a representation of the subpart.

29. A signal-bearing medium tangibly embodying a program of machine-readable instructions executable by a digital processing apparatus to perform operations for restoring a backup dataset in a storage system, where contents of the backup dataset comprise contents of a corresponding original dataset upon creation of the backup dataset, and where changes to the original dataset received by the system after creating the backup dataset are logged by the system in a change log, the operations comprising:
   in response to unavailability of the original dataset, commencing application of the logged changes to the backup dataset; and
   during the application of the logged changes to the backup dataset, receiving one or more requests to access one or more subparts of the original dataset, and responsive to each request, for each subpart:
      determining whether the change log contains any changes not yet applied to the subpart of the backup dataset; and
      satisfying the request by:
         if the log contains one or more changes not yet applied to the subpart of the backup dataset, providing an output of the subpart from the log, the output comprising a most recent one of the logged changes not yet applied;
         if the log does not contains change any not yet applied to the subpart of the backup dataset, providing an output of the subpart from the backup dataset;
   responsive to receipt of each change to the original dataset, representing the change in an update map;
   upon commencing application of the logged changes to the backup dataset, setting an indicator; and
   responsive to application of a logged change to the backup dataset, removing representation of the logged change from the update map;
   where the operation of determining of whether the change log contains any changes not yet applied to the subpart of the backup dataset comprises determining whether the indicator is set, and if the indicator is set, determining whether the update map contains a representation of the subpart.

30. A computer-driven backup system, comprising:
   a data storage containing a backup dataset having contents that comprise contents of a corresponding original dataset upon creation of the backup dataset, the storage maintaining a change log containing changes to the original dataset received by the system after creating the backup dataset; and
   a digital data processing apparatus coupled to the storage and programmed to restore the backup dataset by performing operations comprising:
      in response to unavailability of the original dataset, commencing application of the logged changes to the backup dataset; and
      during the application of the logged changes to the backup dataset, receiving one or more requests to access one or more subparts of the original dataset, and responsive to each request, for each subpart:
         determining whether the change log contains any changes not yet applied to the subpart of the backup dataset; and satisfying the request by:
  if the log contains one or more changes not yet applied to the subpart of the backup dataset, providing an output of the subpart from the log, the output comprising a most recent one of the logged changes not yet applied;
  if the log does not contains any changes not yet applied to the subpart of the backup dataset, providing an output of the subpart from the backup dataset;
responsive to receipt of each change to the original dataset, representing the change in an update map;
upon commencing application of the logged changes to the backup dataset, setting an indicator; and
responsive to application of a logged change to the backup dataset, removing representation of the logged change from the update map; and
where the operation of determining of whether the change log contains any changes not yet applied to the subpart of the backup dataset comprises determining whether the indicator is set, and if the indicator is set, determining whether the update map contains a representation of the subpart.

* * * * *

UNITED STATES PATENT AND TRADEMARK OFFICE
CERTIFICATE OF CORRECTION

PATENT NO. : 6,397,351 B1
DATED : May 28, 2002
INVENTOR(S) : Donald Lee Miller et al.

It is certified that error appears in the above-identified patent and that said Letters Patent is hereby corrected as shown below:

Column 7,
Table 1, column entitled "Name of Backup Dataset", fourth entry, delete "Dataset-2, Internal Backup #1" and replace with -- Datasert-2, External Backup #1 --.

Column 11,
Line 54, delete "contains change any" and replace with -- contain any logged changes --.

Column 12,
Line 16, between the phrases "multiple change" and "such that each constituent" insert the word -- logs --.
Line 56, delete "contains any changes" and replace with -- contain any logged changes --.

Column 13,
Line 17, between the phrases "mutiple change" and "such that each constituent" insert the word -- logs --.

Column 14,
Line 1, delete the word "of" between the words "determining" and "whether."
Line 31, delete "contains change any" and replace with -- contain any logged changes --.
Line 42, delete the word "of" between the words "determining" and "whether."

Column 15,
Line 7, delete "contains any changes" and replace with -- contain any logged changes --.

Column 16,
Line 6, delete the word "of" between the words "determining" and whether."

Signed and Sealed this

Eighth Day of October, 2002

Attest:

Attesting Officer

JAMES E. ROGAN
Director of the United States Patent and Trademark Office